United States Patent
Miyata

(10) Patent No.: US 9,016,106 B2
(45) Date of Patent: Apr. 28, 2015

(54) CONTACT TYPE SHAPE MEASURING APPARATUS

(75) Inventor: Akinori Miyata, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 13/292,838

(22) Filed: Nov. 9, 2011

(65) Prior Publication Data

US 2012/0125088 A1 May 24, 2012

(30) Foreign Application Priority Data

Nov. 24, 2010 (JP) ................. 2010-261597

(51) Int. Cl.
  *G01B 21/04* (2006.01)
  *G01B 21/02* (2006.01)
  *G01B 5/008* (2006.01)

(52) U.S. Cl.
  CPC ............. *G01B 5/008* (2013.01); *G01B 21/045* (2013.01)

(58) Field of Classification Search
  CPC ............................ G01B 21/045; G01B 5/008
  USPC ......................... 73/104, 1.79, 1.81
  See application file for complete search history.

(56) References Cited

U.S. PATENT DOCUMENTS

| | | | | |
|---|---|---|---|---|
| 5,966,681 | A * | 10/1999 | Bernhardt et al. | 702/152 |
| 7,644,507 | B2 * | 1/2010 | Fuchs et al. | 33/503 |
| 2009/0037128 | A1 * | 2/2009 | Kiyotani | 702/95 |
| 2009/0271997 | A1 * | 11/2009 | Ruck et al. | 33/503 |
| 2009/0292503 | A1 * | 11/2009 | Hon et al. | 702/168 |
| 2011/0276303 | A1 * | 11/2011 | Marshall et al. | 702/141 |
| 2012/0169265 | A1 * | 7/2012 | Usui et al. | 318/494 |

FOREIGN PATENT DOCUMENTS

| | | |
|---|---|---|
| EP | 364057 A2 | 4/1990 |
| EP | 2172736 A1 | 4/2010 |
| JP | S64-012935 A | 1/1989 |
| JP | H06-148363 A | 5/1994 |
| JP | 10-019504 A | 1/1998 |
| JP | 2002-144864 A | 5/2002 |
| JP | 2003-338035 A | 11/2003 |
| JP | 2006-340323 A | 12/2006 |
| JP | 2007-057308 A | 3/2007 |
| JP | 2007-121260 A | 5/2007 |
| JP | 2007-292674 A | 11/2007 |
| JP | 2009-020050 A | 1/2009 |
| JP | 2009-036699 A | 2/2009 |

* cited by examiner

*Primary Examiner* — Hezron E Williams
*Assistant Examiner* — Nashmiya Fayyaz
(74) *Attorney, Agent, or Firm* — Canon U.S.A., Inc. IP Division

(57) ABSTRACT

An acting force is applied to a probe on the basis of a target speed serving as a probe speed in a stable copy scanning state of a target surface to be measured and a probe speed error serving as a difference between the target speed and a probe speed.

3 Claims, 6 Drawing Sheets

CONTACT TYPE SHAPE MEASURING APPARATUS

BACKGROUND OF THE INVENTION

1. Field of the Invention

The present invention relates to contact type shape measuring apparatuses, and more particularly, to a contact type shape measuring apparatus that precisely measures a surface shape of a diffraction optical element or a molding die used to form the diffraction optical element.

2. Description of the Related Art

With increase in performance of various optical apparatuses such as an image pickup camera, a laser beam printer, a copying machine, and a semiconductor exposure apparatus, requirements for optical elements to be mounted in these optical apparatuses are becoming increasing high. In particular, diffraction optical elements utilizing light diffraction have recently been used in various products. In diffraction optical elements, a phase difference of light is frequently formed by regularly arranging stepped portions having heights ranging from several tens of micrometers to submicrometers so as to cause diffraction. To measure a surface shape of an optical element having a stepped portion or a surface shape of an optical-element molding die, a contact type shape measuring apparatus has been used widely.

Japanese Patent Laid-Open No. 10-19504 discloses an example of a contact type shape measuring apparatus that measures a surface shape of a target surface of an optical element or an optical-element molding die serving as a target object to be measured. In this apparatus, one end of a probe elastically supported by a moving member, such as an XYZ slider, is brought into contact with the target surface and a three-dimensional position of the other end of the probe from a reference point is measured with a laser length measuring device. A holder (housing) including a spring mechanism for holding the probe is provided between the probe and the moving member. By pressing the moving member toward the probe from a balanced position, a contact force can be applied from the probe to the target surface. When the moving member is driven in the XY directions, the probe traces the shape of the target surface in the Z-direction while moving in the XY-directions. The moving member is controlled so as to follow in the Z-direction to maintain a pressing force corresponding to a predetermined contact force. The probe is scanned over the entire target surface to obtain measurement data. Measurement data obtained in a series of scanning operations reflects the shape of the target surface. By analyzing the measurement data, the shape of the target surface can be measured.

In order to cause the probe to perform precise copy scanning of the target surface, the contact force of the probe with the target surface is minimized.

However, in a case in which the contact force is reduced, if a dust, a projection, or a flaw exists on the target surface, the probe is prone to bounce, and the behavior of the probe becomes unstable. Accurate data cannot be obtained during an unstable period from when the probe bounces from the target surface to when vibration is settled.

Japanese Patent Laid-Open No. 2007-57308 discloses a probe that shortens such an unstable period. A force generating unit is provided in a housing of the probe. When a bounce of the probe is detected, for example, on the basis of the relative displacement between the probe and a moving member, acting force is quickly applied to the probe so as to return the probe onto a target surface to be measured. When a controller detects the bounce of the probe, it applies, to the probe, an acting force for cancelling the bounce of the probe. For example, the acting force is applied by multiplying a proportionality coefficient in accordance with the relative displacement or relative speed between the probe and the moving member.

When the target surface has discontinuous stepped portions like the diffraction optical element, there are the following problems.

When the probe passes over an obstacle serving as a disturbance factor, such as dust, a projection, or a flaw, adhering to a continuously extending target surface, the probe is bounced by collision with the disturbance factor. As a result, the probe moves away from the target surface. In contrast, when a surface having a stepped portion like a diffraction optical element is measured, the probe sometimes measures a higher portion of the surface, passes over the stepped portion, and subsequently measures a lower portion of the surface. In this case, after passing over, the probe separates from the surface even if it does not bounce.

FIG. 6 illustrates how to scan a surface having a stepped portion in the related art disclosed in Japanese Patent Laid-Open No. 2007-57308.

A target surface 2a of a target object 2 to be measured has a stepped portion 2s. A probe 1 provided in a moving member (not illustrated) is subjected to copy scanning in a direction D that is orthogonal to a ridge line of the stepped portion 2s and extends beyond the stepped portion 2s. At a tip of the probe 1, a ball formed of a highly abrasive resistant material is provided to contact with the target surface 2a. In FIG. 6, t1b represents the behavior of the center of the ball of the probe 1, and T9B represents the behavior of the unillustrated moving member. For easy viewing, T9b is shown near T1b. The probe 1 leaps over the stepped portion 2s, temporarily separates from the target surface 2a, but falls with time. After that, the probe 1 collides with the target surface 2a again, and is bounced by reactive force resulting from the collision. In general, the moving member that elastically supports the probe 1 is heavier and moves more slowly than the probe 1. For this reason, the moving member is delayed and follows the probe 1 during a period B1. During a period B2, the moving member overshoots beyond the height of the stepped portion 2s. Although the moving member sometimes repeats vibration, it is assumed here, for easy explanation, that the moving member is stabilized after the period B2. If the probe 1 is moved in conformity with the behavior of the moving member during the period B1, acting force is applied to the probe so that the probe does not separate from the moving member. Hence, the probe 1 floats above the target surface 2a. Conversely, during the period B2, the probe 1 is pressed against the target surface 2a with an excessive acting force. If the probe 1 is pressed with an excessive acting force, the contact force inevitably increases, and the probe 1 is bounced more by reactive force received from the target surface 2a.

In the above-described related art of Japanese Patent Laid-Open No. 2007-57308 in which the probe is controlled on the basis of the relative amount, such as relative displacement/relative speed, between the moving member and the probe, an excessive contact force is prone to occur. This makes it difficult to shorten the unstable period in which the probe is bouncing.

SUMMARY OF THE INVENTION

The present invention provides a contact type shape measuring apparatus that can shorten an unstable period even when a target surface has a stepped portion.

A shape measuring apparatus according to an aspect of the present invention includes a moving member configured to move three-dimensionally; a probe supported movably relative to the moving member; a position measuring unit configured to measure a position of the probe; a probe-speed calculation unit configured to calculate a probe speed serving as speed information in a moving direction of the probe on the basis of position information about the position of the probe obtained by the position measuring unit; a target-speed calculation unit configured to calculate a probe target speed with reference to probe speed information during scanning of a target object to be measured; an acting-force calculation unit configured to calculate an acting force that reduces a probe speed error serving as a different between the probe target speed and the probe speed on the basis of the probe speed error; and a force generating unit configured to generate, in the probe, a force in the moving direction of the probe in accordance with the calculated acting force. The shape measuring apparatus measures a shape of the target object by scanning a surface of the target object and measuring the position of the probe while the probe is in contact with the target object.

According to the contact type shape measuring apparatus of this aspect, an unstable measurement period in which the probe is bouncing can be shortened because the acting force is applied to the probe with the target speed set at the probe speed in a stable copy scanning state.

According to a second aspect of the present invention, a probe speed in a period before the probe passes over the stepped portion may be set as a target speed in a period after the probe passes over the stepped portion, with reference to past information about the probe speed. This reduces an estimated error of the target speed resulting from working error and setting error of the target object.

According to a third aspect of the present invention, when it is determined that the probe is bouncing, the acting force is applied to reduce the probe speed error. This suppresses bouncing of the probe.

According to a fourth aspect of the present invention, when it is determined that the probe is falling, the acting force is applied to pull the probe toward the target surface. This promotes the fall of the probe.

Further features of the present invention will become apparent from the following description of exemplary embodiments with reference to the attached drawings.

DESCRIPTION OF THE EMBODIMENTS

An embodiment of the present invention will be described with reference to the drawings.

Figure 1:
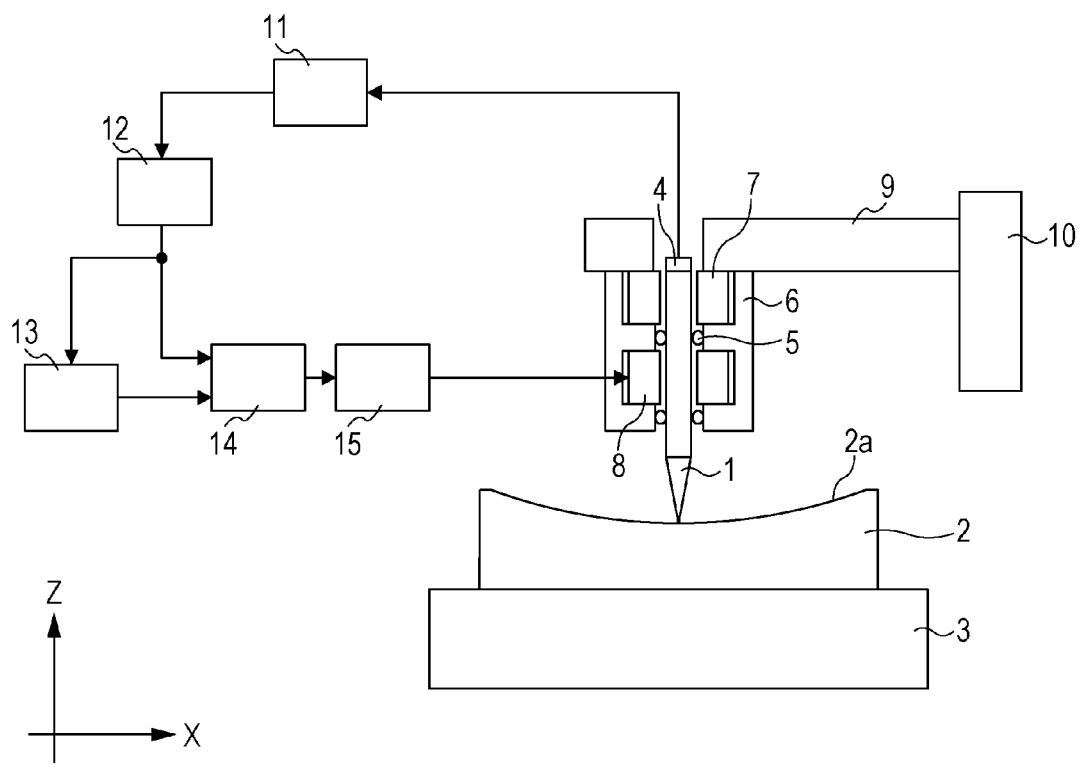
FIG. 1 illustrates a configuration of a contact type shape measuring apparatus according to an embodiment of the present invention.

FIG. 1 illustrates a configuration of a contact type shape measuring apparatus according to the embodiment of the present invention.

The contact type shape measuring apparatus of the embodiment conducts copy scanning on a target surface 2a of a target object 2 to be measured with a probe 1. The target object 2 is set on a surface plate 3. The surface plate 3 can have a vibration preventing function for suppressing the influence of vibration from the floor. Further, the surface plate 3 can have a structure and a material that are unlikely to be deformed by the temperature change. A mirror 4 is provided at a rear end of the probe 1, and measures a three-dimensional position of the probe 1, for example, by interferometric measurement. The probe 1 is supported in a housing 6 with a linear guide 5 being disposed therebetween, and is movable in one axial direction relative to the housing 6. The linear guide 5 can adopt, for example, an air bearing such as to be easily movable in a moving direction and to have high rigidity in a direction orthogonal to the moving direction. The housing 6 is provided with a spring mechanism 7 such that the weight of the probe 1 is compensated and such that the probe 1 can be pressed against the target surface 2a with a specified contact force. The spring mechanism 7 is formed by a leaf spring using the rigidity of the material or an electromagnetic spring using magnetic force. Besides the spring mechanism 7, the housing 6 is provided with a force generating unit 8 that applies acting force to the probe 1. The force generating unit 8 can be an electromagnet type mechanism that adjusts the magnitude of generated force by controlling the current flowing through a coil according to an input signal.

The spring mechanism 7 can generate a fixed acting force. While both the spring mechanism 7 and the force generating unit 8 are mounted in the embodiment, acting force acting on the probe 1 may be generated only by the force generating unit 8 without providing the spring mechanism 7.

When the force generating unit 8 is of an electromagnet type, the contact force of the probe 1 with the target object 2 can be adjusted by controlling the current so as to adjust the acting force to be applied to the probe 1. Further, the housing 6 is provided at a distal end of a moving member 9. The moving member 9 is attached to a driving unit 10 and is movable three-dimensionally. The driving unit 10 can have a structure suitable for the shape of the surface of the target object 2, for example, a structure capable of driving in three-axis translation directions, or in two-axis translation directions and a one-axis rotation direction. The driving unit 10 drives the moving member 9 to maintain a constant relative displacement between the probe 1 and the moving member 9. For example, the moving member 9 and the driving unit 10 are formed by a ball screw type XYZ slider in which intersecting columnar bodies are moved by driving force generated by a motor.

During measurement, a flow of the following processes (1) to (5) serving as one cycle is repeated until the end of measurement:

(1) A position measuring unit 11, for example, using interferometric measurement samples three-dimensional positions of the probe 1 at specified time intervals as information about the three-dimensional position from a reference position;

(2) A probe-speed calculation unit 12 receives the position information about the probe 1 and calculates a probe speed serving as information about the speed in a moving direction of the probe 1 along the target surface 2a;

(3) A target-speed calculation unit 13 receives the above probe speed and calculates a probe target speed;

(4) An acting-force calculation unit 14 calculates an acting force to be applied to the probe 1, on the basis of the probe target speed and the probe speed; and (5) A force control unit 15 applies, to the force generating unit 8, a current in accordance with the acting force.

The target-speed calculation unit 13 may calculate an inclination in the probe scanning direction by using a continuous function after a stepped portion is removed from the designed shape of the target surface 2a, without using the above probe speed.

The force generating unit 8 can cut an acting force in a direction in which the probe 1 moves away from the target surface 2a or cut an acting force larger than a specified value even in a direction in which the probe 1 moves closer to the target surface 2a. Further, digital filtering may be performed to reduce high-frequency signals and signals of specific frequencies.

Structures characteristic of the present invention will be described in detail below.

Calculation of Probe Target Speed

Figure 2:
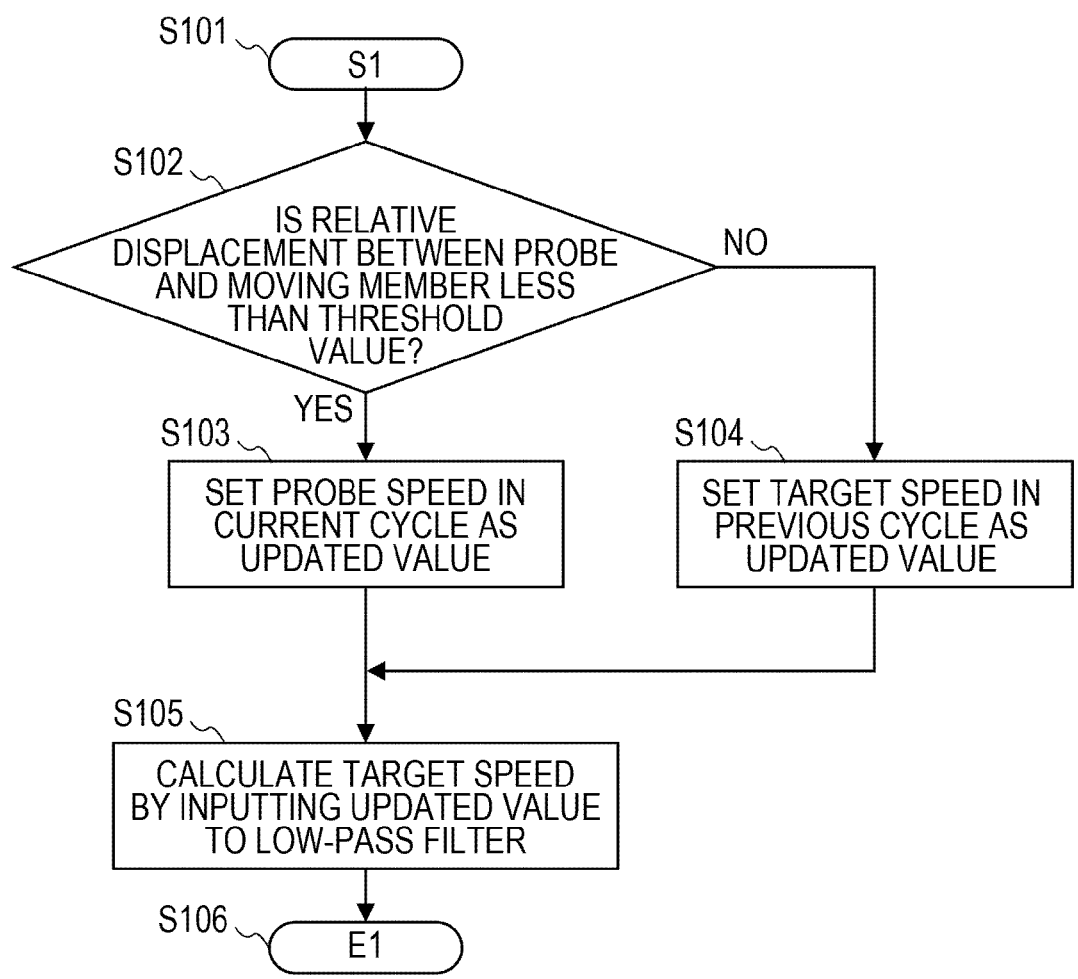
FIG. 2 is a flowchart showing a method for calculating a target speed in the embodiment.

FIG. 2 is a flowchart showing a detailed method for calculating a probe target speed, corresponding to the above process (3), according to the present invention.

In Step S101, a probe speed in the current cycle calculated by the probe-speed calculation unit 12 is input. As an example, when a vertical direction is designated as a Z-direction and attention is paid to the Z-direction serving as one speed component in the moving direction of the probe 1, the probe speed can be obtained by calculating dz/dt. The value dz/dt indicates the amount of displacement of the probe 1 in the Z-direction at a certain time interval, and can be easily obtained from data on the measured three-dimensional positions of the probe 1 sampled at the specific time intervals.

Although the vector direction of the probe speed to be found is not limited to the Z-direction, the probe speed in the Z-direction, that is, dz/dt is given as an example for the following description.

In Step S102, it is determined whether or not the relative displacement between the probe 1 and the moving member 9 is less than or equal to a threshold value. When the relative displacement therebetween is less than or equal to the threshold value, there is a high possibility the probe 1 is stably scanning the target surface 2a. In this case, in Step S103, the probe speed in the current cycle is set as an updated probe target speed. The difference between the probe speed and the probe target speed is substantially zero.

In contrast, when the relative displacement between the probe 1 and the moving member 9 exceeds the threshold value, there is a high possibility that the probe 1 is falling off the target surface 2a or is bouncing. In this case, in Step S104, the probe speed in the current cycle is not used as a probe target speed, but the target speed in the previous cycle is set as an updated value. Next, in Step S105, the updated value is input to a low-pass filter, and a probe target speed is calculated. In Step S106, the calculated probe target speed is output. According to the above-described method, in a state in which the probe is falling or bouncing, a probe speed in a stable scanning state can be set as a probe target speed with reference to past information. That is, in a period after scanning of the stepped portion, the probe speed in a period before scanning of the stepped portion can be set as the probe target speed. Alternatively, the target speed may be set by being converted into an axial direction component of the probe 1 (a direction perpendicular to the direction D in FIG. 4) instead of being converted into the component in the direction along the target surface 2a.

For example, another way to set the probe target speed with reference to past information is to set, as the target speed, a probe speed along the target surface 2a in a period before the probe 1 passes over the stepped portion, by determining the position of the stepped portion from the designed shape. As long as the designed shape of the target surface 2a and the scanning speed of the probe 1 are determined beforehand, it is possible to easily calculate the probe speed during scanning along the target surface 2a.

By applying a below-described acting force corresponding to the probe target speed after thus setting the past probe speed as the target speed of the probe that has passed over the stepped portion, an estimated error of the target speed resulting from working error and setting error of the target object can be reduced.

Calculation of Acting Force to be Applied to Probe

Figure 3:
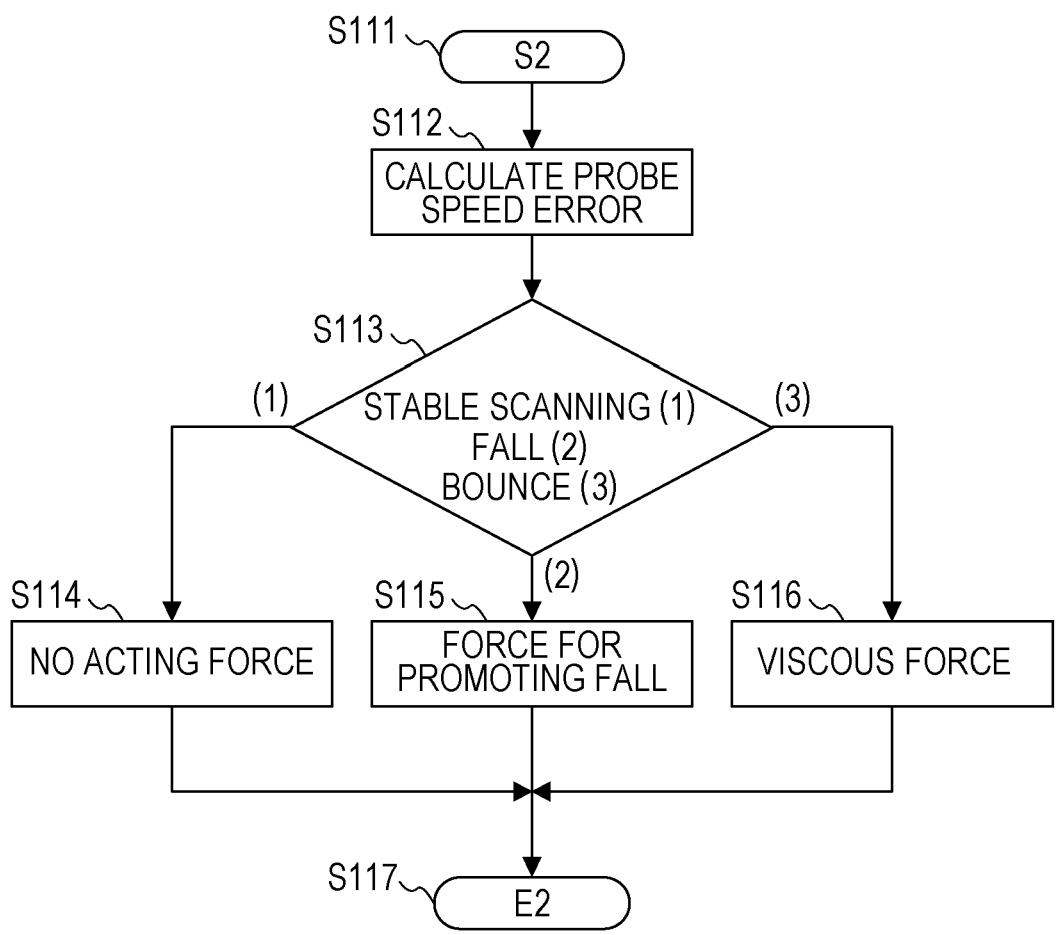
FIG. 3 is a flowchart showing a method for calculating an acting force in the embodiment.

FIG. 3 is a flowchart explaining a method for calculating an acting force to be applied to the probe 1 of the embodiment, corresponding to the above process (4), on the basis of the probe target speed obtained in the above process (3) and the calculated probe speed.

In Step S111, the probe target speed and the probe speed are input. In Step S112, a probe speed error is calculated by subtracting the current probe speed from the set probe target speed. In Step S113, it is determined, on the basis of the probe speed error, whether the probe 1 is stably scanning, falling, or bouncing. When the probe speed error is within a predetermined threshold range, it is determined that the probe 1 is stably scanning, and the procedure proceeds to Step S114. When the probe speed error comes out of the threshold range in a direction such that the probe 1 moves closer to the target surface 2a, it is determined that the probe 1 is falling, and the procedure proceeds to Step S115. When the probe speed error comes out of the threshold range in a direction such that the probe 1 moves away from the target surface 2a, it is determined that the probe 1 is bouncing, and the procedure proceeds to Step S116. In Step S114, no force is applied as an acting force because the probe 1 is in a stable scanning state. However, when the force generating unit 8 also functions as the spring mechanism 7, a force corresponding to the spring mechanism 7 is set as an acting force. In Step S115, a force for promoting the fall is set as an acting force. For example, a fixed value fc is applied. In Step S116, a viscous force for suppressing the behavior of the probe 1 is set as an acting force. For example, an acting force is obtained by multiplying the probe speed error by a viscosity coefficient cv. In Step S117, the obtained acting force is output. In this way, when the probe speed error is less than the threshold value that is less than the probe target speed, the acting-force calculation unit 14 further calculates a fixed acting force in a direction such that the probe 1 moves closer to the target object. Thus, it is possible to expect a further effect of restricting floating of the probe 1.

When the fixed value fc is too small, the fall cannot be promoted, and the floating time increases. This makes it difficult to shorten an unstable period. In contrast, when the fixed value fc is too large, when the probe 1 collides with the target surface, it makes a flaw thereon. For this reason, the fixed value fc can be set to be as small as possible in correspondence with an allowable unstable period. Further, to suppress the occurrence of a flaw, for example, the acting force fc is cut when the probe speed exceeds a specified value.

If the viscosity coefficient cv is too low, the viscous force is insufficient, and bouncing is not suppressed. This makes it difficult to shorten the unstable period. In contrast, when the viscosity coefficient cv is too high, oscillation occurs, and this also makes it difficult to shorten the unstable period. For this reason, for example, the viscosity coefficient cv is properly adjusted within a stable range by measuring the frequency response.

Figure 4A:
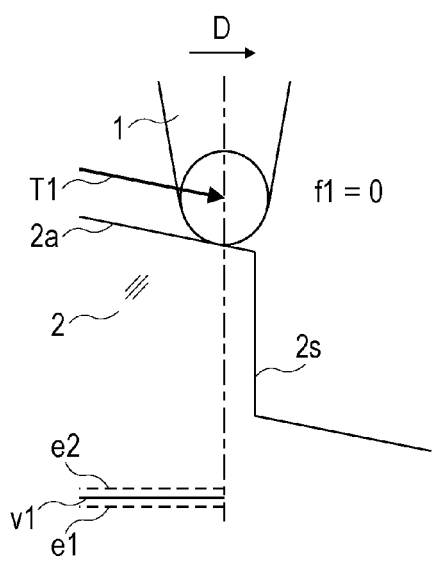
FIGS. 4A to 4C illustrate how to scan a stepped portion in the embodiment.
Figure 4B:
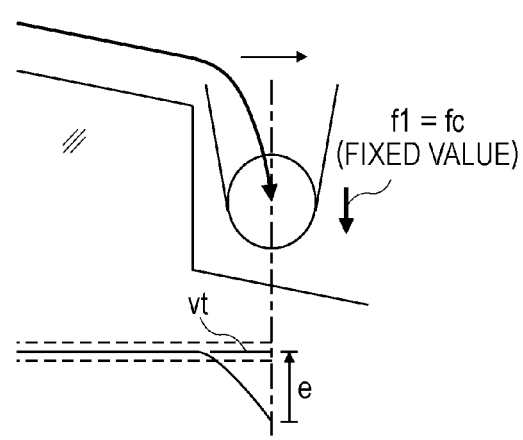
Figure 4C:
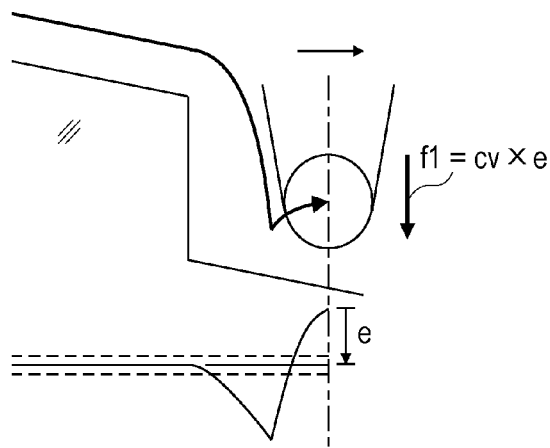

FIGS. 4A to 4C illustrate how to scan a stepped portion 2s provided on the target surface 2a of the target object 2 according to the embodiment of the present invention. The probe 1 is subjected to copy scanning in a direction D which is orthogonal to a ridge line of the stepped portion 2s and in which the probe 1 leaps from the stepped portion 2s. The direction D may be determined from the designed shape.

While the probe 1 may be scanned in a direction different from the direction D by moving the moving member 9 with force generated by the driving unit 10, the probe 1 may impair the shape of the stepped portion 2s, for example, because of collision with the stepped portion 2s. For this reason, the probe 1 can be scanned in the direction D or a close direction. In FIGS. 4A to 4C, T1 represents the behavior of the ball center of the probe 1, and f1 represents the acting force. Further, the probe speed v1, the target speed vt, the threshold value e1 used to determine a falling state, and the threshold value e2 used to determine a bouncing state are shown in a lower part in correspondence with the behavior T1 of the ball center. The probe speed error e can be obtained by subtracting the probe speed v1 from the probe target speed vt ($e=|vt-v1|$). Referring to FIG. 4A, the probe 1 is scanning a portion short of the stepped portion 2s. At this time, the probe 1 is stably performing scanning, and the probe speed v1 is within the range of e1 to e2. For this reason, the force generating unit 8 does not generate any force as the acting force f1 ($f1=0$), and does not apply any acting force to the probe 1.

Referring to FIG. 4B, the probe 1 falls beyond the stepped portion 2s. When the probe speed error e exceeds e1, it is determined that the probe 1 is falling, and the acting force f1 is set at fc, so that the fall is promoted. In FIG. 4C, the probe 1 collides with the target surface 2a again, and is thereby bounced. When the probe speed error e exceeds e2, it is determined that the probe 1 is bouncing, and the acting force f is set at the viscous force cv×e (the probe speed error e is multiplied by a proportionality coefficient cv serving as the viscosity coefficient), so that bouncing is suppressed. When the probe 1 is stabilized, the probe speed error e returns within the range of e1 to e2 again. Hence, it is determined that the probe 1 is in a stable scanning state.

That is, on the basis of the probe speed error serving as the difference between the probe target speed and the probe speed, the acting force for reducing the probe speed error is calculated and is applied in the moving direction of the probe 1.

Figure 5:
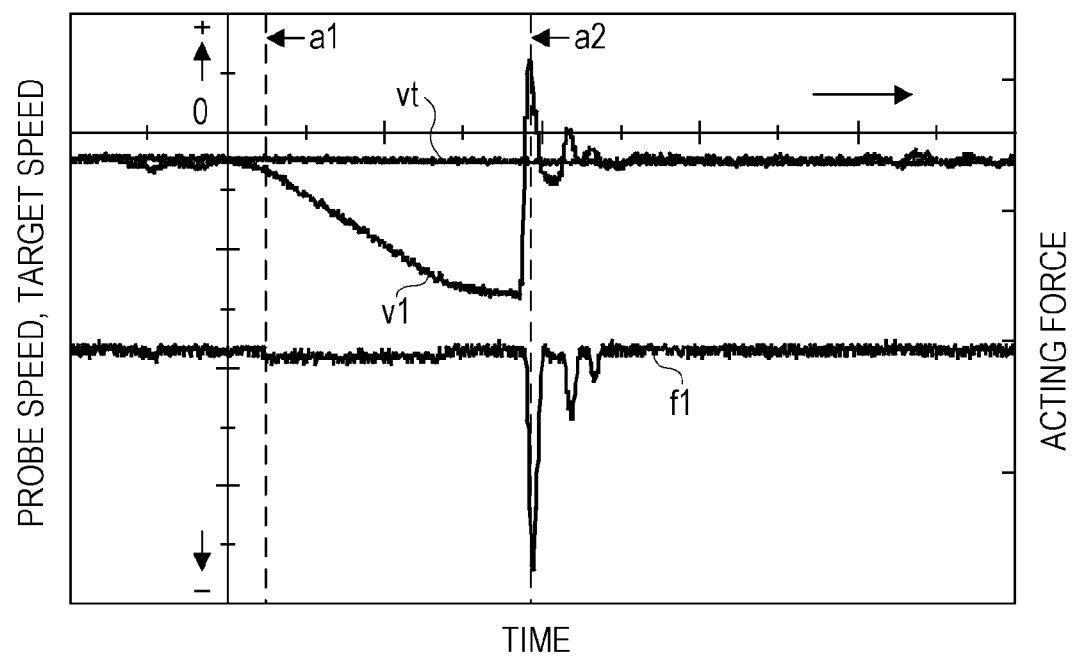
FIG. 5 explains the change in acting force in the embodiment.
Figure 6:
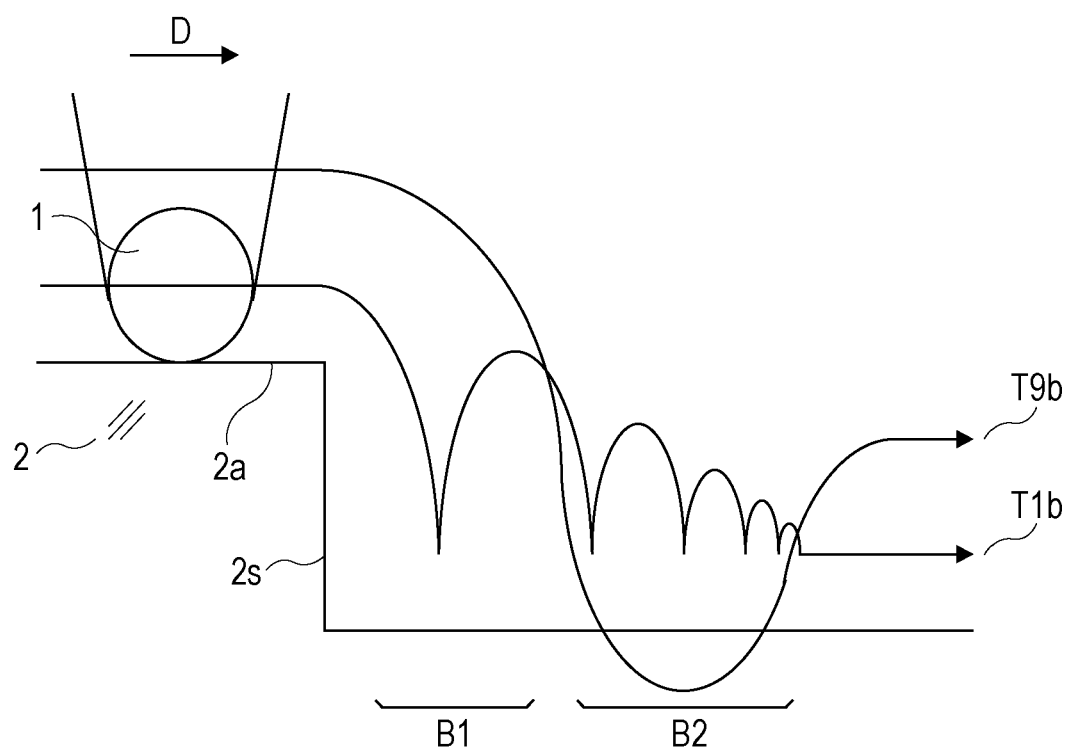
FIG. 6 illustrates how to scan a surface having a stepped portion in the related art.

FIG. 5 explains the change in acting force in the embodiment of the present invention. The horizontal axis indicates the time, and the vertical axis indicates the probe speed v1, the probe target speed vt, and the acting force f1. The values in a state in which the probe 1 passes over the stepped portion at a time 0 are plotted. The probe target speed vt and the probe speed v1 are shown together in an upper part of FIG. 5, and the force acting on the probe 1 is shown in a lower part of FIG. 5. In the embodiment, the probe speed is set such as to have a positive value in a vertical upward direction. Further, it is assumed that the target surface 2a has the stepped portion 2s sloping downward in the scanning direction D, as illustrated in FIGS. 4A to 4C.

Therefore, the probe 1 falls in a vertical downward direction as it is scanned along the target surface 2a. Hence, vt takes a negative value.

When it is determined at a time a1 that the probe is falling, the fall is promoted by applying a fixed value (the probe speed v1 is decreasing, that is, the pressing force is increasing). Subsequently, when it is determined at a time a2 that the probe 1 is bouncing, the bouncing is suppressed by applying the viscous force as the acting force (the increase in probe speed is suppressed by applying a force in an opposite direction in proportion to the probe speed v1). Here, unlike the related art, the acting force such that the probe moves in accordance with the behavior of the moving member is not applied. For this reason, the acting force can be applied to stabilize the probe, regardless of whether or not the moving member is stable. After that, the probe returns to a stable scanning state in a short time.

In the above-described embodiment, the target surface is a flat surface having a stepped portion. However, a spherical, aspherical, or free-form surface having a stepped portion can be regarded similar to the flat surface having the stepped portion as long as the unstable period can be stabilized in a small area of, for example, 30 μm or less.

In the above embodiment, the scanning speed of the probe is fixed. However, when the unstable period terminates in a short time of 0.03 seconds or less and the scanning speed more gently changes than this, this case can be regarded as similar to the case in which the scanning speed is fixed.

As described above, according to the contact type shape measuring apparatus of the present invention, it is possible to shorten the unstable period during measurement of a surface having a stepped portion.

The present invention relates to a contact type shape measuring apparatus, and more particularly, the present invention is suitably used to precisely measure the surface shape of a diffraction optical element or a molding die for producing the diffraction optical element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-261597 filed Nov. 24, 2010, which is hereby incorporated by reference herein in its entirety.

What is claimed is:

1. A shape measuring apparatus comprising:
a moving member configured to move three-dimensionally;
a probe supported movably relative to the moving member;
a position measuring unit configured to measure a position of the probe;
a probe-speed calculation unit configured to calculate a probe speed serving as speed information in a moving direction of the probe on the basis of position information about the position of the probe obtained by the position measuring unit;
a target-speed calculation unit configured to calculate a probe target speed with reference to probe speed information of the probe scanning a target object to be measured;
an acting-force calculation unit configured to calculate an acting force that reduces a probe speed error serving as a difference between the probe target speed and the probe speed on the basis of the probe speed error; and
a force generating unit configured to generate, in the probe, an acting force of a component in the moving direction of the probe in accordance with the calculated acting force;
wherein the shape measuring apparatus measures a shape of the target object by scanning a surface of the target object and measuring the position of the probe while the probe is in contact with the target object, wherein the target-speed calculation unit sets the target speed whether a relative displacement between the moving member and the probe is within a threshold value or not, wherein if the relative displacement is within the threshold value, the target-speed calculation unit sets the target speed with reference to a current probe speed, and wherein if the relative displacement exceeds the threshold value, the target-speed calculation unit sets the target speed with reference to past speed information of the probe.

2. The shape measuring apparatus according to claim 1, wherein the acting-force calculation unit calculates the acting force by multiplying the probe speed error by a proportionality coefficient when the probe speed error exceeds a threshold value.

3. The shape measuring apparatus according to claim 1, wherein the acting-force calculation unit calculates a fixed acting force when the probe speed error exceeds a threshold value.

* * * * *